United States Patent
Reiderman et al.

(10) Patent No.: US 8,305,081 B2
(45) Date of Patent: Nov. 6, 2012

(54) CANCELLATION OF VIBRATION NOISE IN DEEP TRANSIENT RESISTIVITY MEASUREMENTS WHILE DRILLING

(75) Inventors: Arcady Reiderman, Houston, TX (US); Vladimir Dubinsky, Houston, TX (US); Zarema Dubinsky, legal representative, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 305 days.

(21) Appl. No.: 12/832,536

(22) Filed: Jul. 8, 2010

(65) Prior Publication Data

US 2011/0012602 A1 Jan. 20, 2011

Related U.S. Application Data

(60) Provisional application No. 61/226,097, filed on Jul. 16, 2009.

(51) Int. Cl.
*G01V 3/10* (2006.01)
(52) U.S. Cl. ........................... 324/337; 324/339
(58) Field of Classification Search .................. 324/337, 324/339
See application file for complete search history.

(56) References Cited

U.S. PATENT DOCUMENTS

| | | | |
|---|---|---|---|
| 4,945,309 A | 7/1990 | Spies | |
| 4,980,642 A | 12/1990 | Rodney | |
| 4,980,682 A | 12/1990 | Klein et al. | |
| 5,452,761 A | 9/1995 | Beard et al. | |
| 5,780,784 A | 7/1998 | Robbins et al. | |
| 6,742,604 B2 * | 6/2004 | Brazil et al. | 175/45 |
| 7,150,316 B2 | 12/2006 | Itskovich | |
| 7,167,006 B2 | 1/2007 | Itskovich | |
| 2002/0057211 A1* | 5/2002 | Tubel et al. | 340/856.4 |
| 2005/0092487 A1 | 5/2005 | Banning et al. | |
| 2005/0189945 A1 | 9/2005 | Reiderman | |
| 2006/0061364 A1 | 3/2006 | Banning et al. | |
| 2006/0098531 A1 | 5/2006 | Gardner et al. | |
| 2007/0108981 A1 | 5/2007 | Banning-Geertsman et al. | |
| 2007/0256832 A1 | 11/2007 | Hagiwara et al. | |
| 2008/0315882 A1 | 12/2008 | Seydoux et al. | |
| 2009/0085767 A1 | 4/2009 | Cartwright | |
| 2009/0108845 A1 | 4/2009 | Kaminski | |

* cited by examiner

*Primary Examiner* — Reena Aurora
(74) *Attorney, Agent, or Firm* — Mossman Kumar & Tyler PC

(57) ABSTRACT

A transient electromagnetic (TEM) signal is recorded in an earth formation during vibration of a logging tool. Concurrently, accelerometer measurements are made. The accelerometer measurements are used to correct the TEM signal for the vibration using the accelerometer measurement and a transfer function relating the TEM signal and the accelerometer. The transfer function may be determined using measurements in a water tank or by using the tail end of the TEM measurements.

18 Claims, 5 Drawing Sheets

US 8,305,081 B2

CANCELLATION OF VIBRATION NOISE IN DEEP TRANSIENT RESISTIVITY MEASUREMENTS WHILE DRILLING

CROSS-REFERENCES TO RELATED APPLICATIONS

This application claims priority from U.S. Provisional Patent Application Ser. No. 61/226,097 filed on Jul. 16, 2009.

BACKGROUND OF THE DISCLOSURE

1. Field of the Disclosure

The disclosure is related to the field of electromagnetic induction well logging for determining the resistivity of earth formations penetrated by a wellbore. More specifically, the disclosure relates to measuring the transient signals in an induction tool in the presence of vibration of the logging tool used for making measurements.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available downhole.

Deep transient logging while drilling (LWD), especially "look-ahead" capability, was shown to have a great potential in predicting over-pressured zones, detecting faults in front of the drill bit in horizontal wells, profiling massive salt structures, etc. One of the main problems of deep transient measurements in LWD application is a parasitic signal due to the conductive drill pipe. A variety of techniques have been used to reduce this parasitic signal in the acquired data. For the purposes of the present disclosure, we adopt the following definition of the term "Transient Electromagnetic Method" from the Schlumberger Oilfield Glossary:

A variation of the electromagnetic method in which electric and magnetic fields are induced by transient pulses of electric current in coils or antennas instead of by continuous (sinusoidal) current.

Many of the applications for TEM involve depths of investigation of up to 100 m. A solution for the high energy excitation source for deep transient measurements has been disclosed in US 20050189945 of Reiderman. However, high sensitivity induction receivers are known to suffer from impulsive noise due to motion of the inductive coil in the earth's magnetic field. Methods have been proposed for cancellation of acoustic noise in acoustic LWD tools. See, for example, U.S. Pat. No. 6,470,245 to Dubinsky where the cancellation signal is derived from the time-reversed tool mode and formation mode signals.

The present disclosure is directed towards methods for removal of low frequency (below about 1 kHz) noise in TEM signals caused by drill string vibration in the earth's magnetic field.

SUMMARY OF THE DISCLOSURE

One embodiment of the disclosure is a method of evaluating an earth formation using a carrier conveyed within a borehole in the earth formation. The method includes: using a transmitter on the carrier for producing an electromagnetic signal in the earth formation; using at least one antenna on the carrier for producing a first signal responsive to interaction of the transient signal with the earth formation, the first signal including a noise resulting from vibration of the carrier; correcting the first signal for the noise and producing a corrected first signal using a second signal indicative of the vibration of the carrier; estimating a distance to an interface in the earth formation using the corrected first signal; and conducting further operations using the estimated distance.

Another embodiment of the disclosure is an apparatus configured to evaluate an earth formation. The apparatus includes: a carrier configured to be conveyed in a borehole; a transmitter on the tool configured to produce an electromagnetic signal in the earth formation; at least one antenna on the tool configured to produce a first signal responsive to an interaction of the transient signal with the earth formation, the first signal including a noise resulting from vibration of the tool; at least one accelerometer on the tool configured to produce at least one second signal indicative of the vibration of the tool; and at least one processor configured to: produce a corrected first signal using the first signal and the measured at least one second signal estimate a distance to an interface in the earth formation using the corrected first signal; and conduct further operations using the estimated distance.

Another embodiment of the disclosure is a computer-readable medium product having stored thereon instructions that when read by at least one processor cause the at least one processor to execute a method. The method includes: correcting a first signal received by at least one antenna on a carrier conveyed in a borehole responsive to a transient electromagnetic signal produced by a transmitter on the carrier for an effect of vibration of the tool using a measurement made by an accelerometer on the tool; using the corrected first signal to estimate a distance to an interface in the earth formation; and conducting further operations using the estimated distance.

DESCRIPTION OF EXEMPLARY EMBODIMENTS

Figure 1:
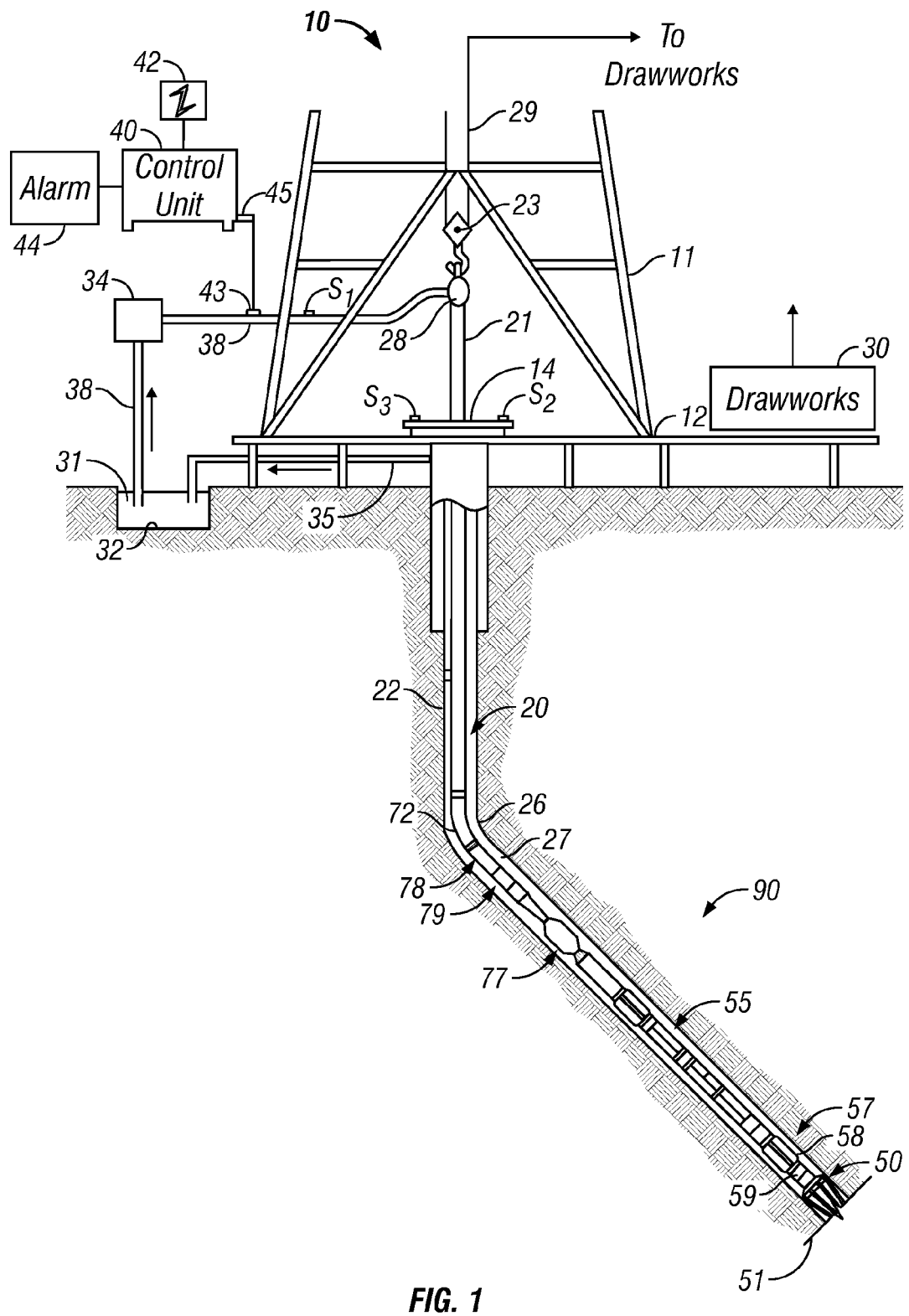
FIG. 1 shows a resistivity logging instrument according to the present disclosure conveyed in a borehole.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ may be placed in the line 38 to provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit 40 may be configured to activate alarms 44 when certain unsafe or undesirable operating conditions occur.

Figure 2:
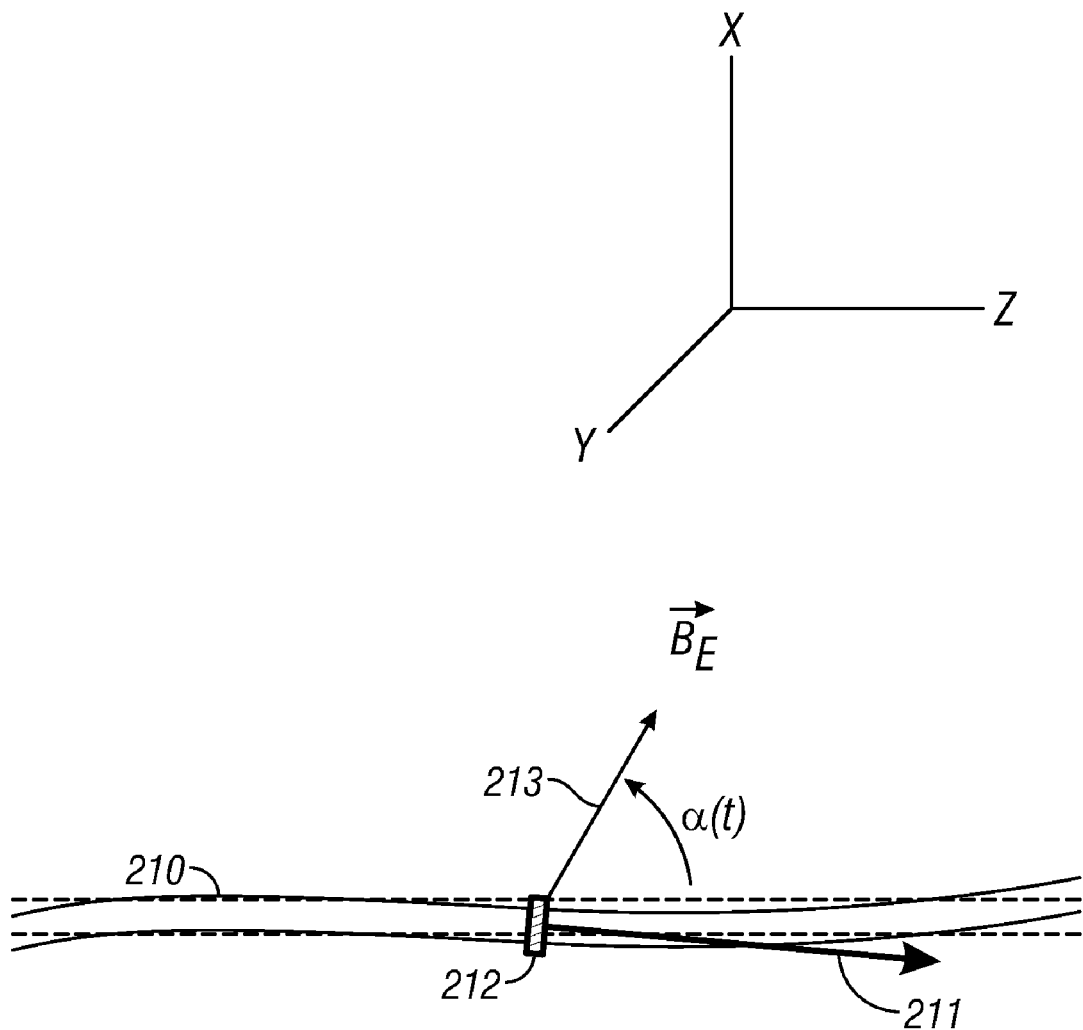
FIG. 2 illustrates the cause of the parasitic signal in a receiver coil vibrating in the earth's magnetic field.

FIG. 2 illustrates the cause of the parasitic signal in a receiver coil 212 on a vibrating drillstring 210. The vibration of the drillstring produces a displacement $\xi(z,t)$ of the drillstring in the XZ plane. The spatial derivative $$\left(\frac{\partial \xi}{\partial z}\right)$$

of the displacement determines an instant angle α between the receiver coil axis 311 and Z-axis—the average direction of the drill string axis. The direction 313 in the XZ plane in FIG. 2 exemplifies a direction the earth's magnetic field with respect to the coil axis 311. The voltage induced in the receiver coil can be expressed as $$V_{rv}(t) = \frac{\partial}{\partial t}(B_E \cdot A_r \cdot \cos\alpha) \approx A_r \cdot [B_E \cdot \sin\alpha_E] \cdot \left[\frac{\partial}{\partial t}\left(\frac{\partial \xi}{\partial z}\right)\right], \quad (1)$$

where $B_E$ is the magnitude of the projection of the earth's magnetic field onto the XZ plane, $A_r$ is the effective area of the receiver coil, and $\alpha_E$ is the earth's magnetic field angle with respect Z-axis. The first term on the right hand side of eqn. (1) is a geometric correction which depends upon the earth's magnetic field and its inclination to the Z-axis. The second term is what would be measured by a rotational accelerometer on the tool. It should be noted that accelerometers responsive to linear acceleration may also be used for the purpose at the cost of more complicated processing.

In one embodiment of the disclosure, the approximation is made that the drill string vibration pattern can be represented by a sine wave. Typically, this has a frequency in the range 5-50 Hz. The lateral acceleration of the drillstring is then a sine wave described by the following expression $$g(t) = \frac{\partial^2 \xi}{\partial t^2} = g_0 \cos[\omega_0(t - \theta - z/v)], \quad (2)$$

$\theta$ – random time where $g_0$ is the acceleration amplitude, z and v are the position on the drill string and the sound velocity in the drill collar respectively, and $\omega_0$ is the vibration frequency.

The receiver coil voltage associated with the coil vibration can then be expressed as $$V_{rv}(t) = \frac{g_0}{v} \cdot A_r \cdot B_E \cdot \sin\alpha_E \cdot \cos(\omega_0 t + \varphi), \quad (3)$$

where $\varphi$ is a random phase.

Figure 3:
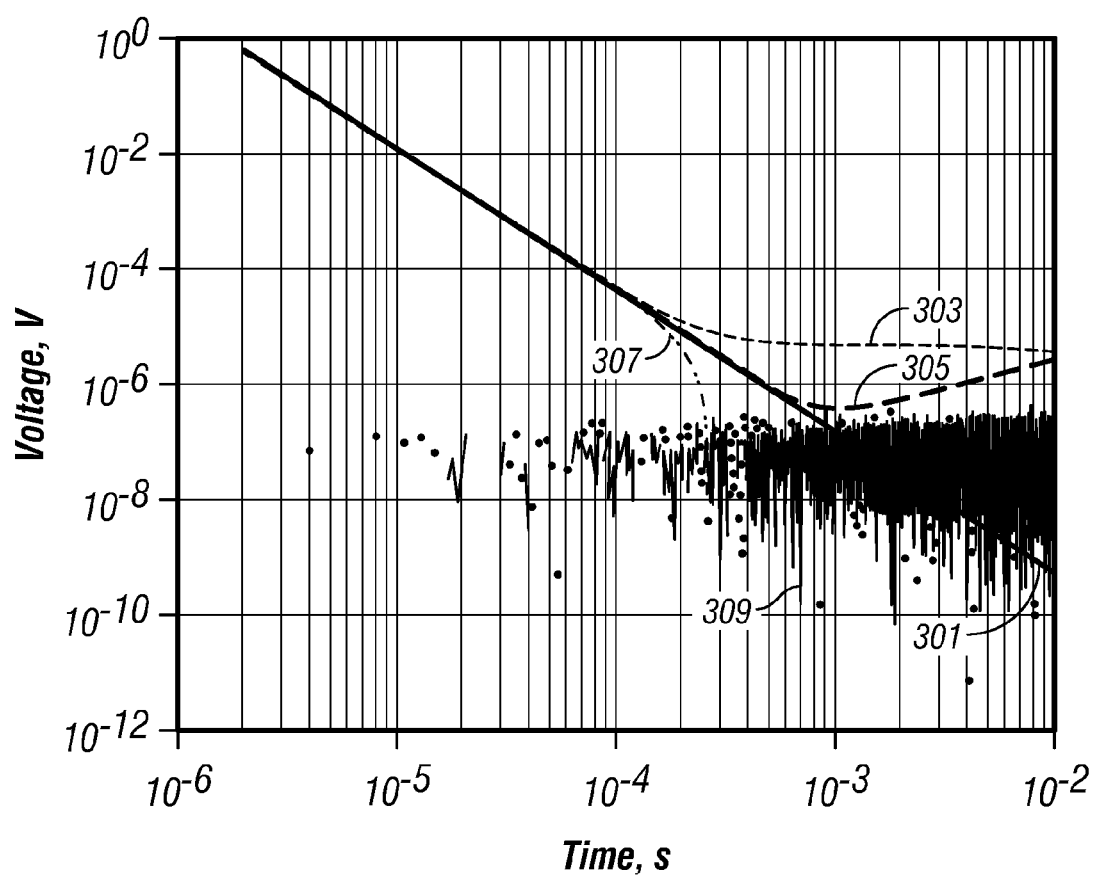
FIG. 3 illustrates the effect of coil vibration in the earth's magnetic field.

By way of illustration, the noise voltage $V_{rv}(t)$ is estimated and compared it with a typical transient signal in the receiver. The following system parameters are taken for the illustration: the transmitter dipole moment $M_r=200 A \cdot m^2$ (the transmitter axially spaced apart from the receiver by 5 m distance is not shown in FIG. 2), the receiver effective area $A_r=20 m^2$, the acceleration amplitude $g_0=20$ m/s$^2$, the sound velocity v=5000 m/s, the earth's magnetic field induction $B_E=60$ µT the angle $\alpha_E=\pi/2$. FIG. 3 shows the results of comparison: the curve 301 is a time domain formation signal modeled for a homogeneous formation with conductivity 0.1 S/m. The curves 303, 305, 307 are superposition of the formation signal three different realizations of the vibration noise (three realizations of the random phase $\phi$). 309 is a realization of a typical broadband thermal noise: voltage noise of a preamplifier with 1 nV/$\sqrt{Hz}$ noise spectral density and 10 KHz bandwidth. For the purposes of the present disclosure, the term "carrier" is used to include the portion of the BHA that includes the transmitter, receiver, accelerometer and magnetometer.

FIG. 3 illustrates the severity of the vibration related noise: the vibration noise in late times, corresponding to deeper regions of investigation in the formations, heavily dominates the formation signal and the thermal noise of the preamplifier. It follows from eqn. (1) that a magnetometer data (first bracketed expression) and a rotational accelerometer reading (second bracketed expression) respectively should potentially allow for calculating and eliminating the unwanted vibration signal in the receiver coil.

It is to be noted that the eqn. (1) was derived in the assumption that the accelerometer is collocated with the receiver coil. In a more general case the relationship between the vibration related noise in the receiver coil and the accelerometer readings can be expressed as $$V_{rvi}(t) = \int_0^t A_i(\tau) \cdot K_{rai}(t-\tau) d\tau, \quad (4)$$

Here $K_{rai}(t-\tau)$ is the accelerometer-to-receiver transfer function for a one-axis rotational accelerometer, and $A_i(t)$ is the one-axis accelerometer reading.

Each transfer function in eqn. (4) depends on the earth's magnetic field magnitude and direction with respect to the receiver coil axis:

$$K_{rai}(t) \equiv K_{rai}(t, \vec{B}_E). \quad (5)$$

The transfer functions $K_{rai}(t-\tau)$ are determined beforehand by using a pulsed excitation or harmonic acoustic excitation in a range of frequencies. In an alternative embodiment of the disclosure, determination of the transfer function $K_{rai}(t-\tau)$ is done during the LWD process by acquiring an additional set of data at a later time interval beyond the time interval of interest. Due to faster decay of the formation signal the additionally acquired data contain negligible (less than a tolerable systematic error) portion of the formation signal.

Then current accelerometers data $A_i(t)$ and the magnetometer readings can be used to eliminate the vibration related induction signal from the receiver data $$\text{Data}' = \text{Data} - \sum_{i=1,2,3} \int_0^t A_i(\tau) \cdot K_{rai}(t-\tau, \vec{B}_E) d\tau. \quad (6)$$

In many practical cases the transfer functions $K_{rai}(t, \vec{B}_E)$ are not stable enough, then a statistical approach can be used to adaptively construct the transfer function as described in U.S. Pat. No. 6,470,275 to Dubinsky having the same assignee as the present disclosure and the contents of which are incorporated herein by reference.

In Dubinsky, the desired formation acoustic signals are measured by hydrophones. Accelerometers are positioned near each of the hydrophones. In one embodiment of Dubinsky, a measurement is made in a test tank where there is no formation signal. Under this condition, both the accelerometer and the hydrophone are responding to only the tool mode acoustic signal. A transfer function between the two can then be determined. Subsequently, when the tool is deployed in a borehole, the hydrophone responds to both the tool mode and the formation mode, while the accelerometer responds primarily to the tool mode. The accelerometer signal and the estimated transfer function are used to correct the hydrophone signal to remove the tool mode.

By way of analogy, in the present disclosure, the antenna responds to the formation signal and a tool mode signal caused by the vibration of the tool, while the accelerometer is responsive only to the tool vibration. Hence the method disclosed by Dubinsky is directly applicable with one modification discussed below. The measurements made in a test tank may be referred to as calibration signals. These include accelerometer measurements made responsive to reference excitation of the drillstring in the test tank and antenna signals responsive to excitation of the transmitter during the reference excitation. The reference excitation may be a step function, or a monochromatic excitation at a plurality of frequencies.

When a step function is used, spectral analysis of the accelerometer and antenna signals gives a measured transfer function. With monochromatic excitation, the ratio of the accelerometer signal and the antenna signal gives a measured value of the transfer function at the frequency of excitation. By repeating at a plurality of frequencies, the measured transfer function is determined at a plurality of frequencies. However, this measured transfer function cannot be used directly: it has to be modified for downhole conditions. Specifically, the measured transfer function is divided by the term $[B_{ET} \cdot \sin \alpha_{ET}]$ where $B_{ET}$ is the earth's magnetic field in the test tank and $\alpha_{ET}$ is the inclination of the Z-axis to the earth's magnetic field in the test tank, and multiplied by $[B_{ED} \cdot \sin \alpha_{ED}]$ where $B_{ED}$ is the earths' magnetic field under downhole conditions, and $\alpha_{ED}$ is the angle between the earth's magnetic field and the Z-axis to give the transfer function relating the antenna measurements and the accelerometer measurements under borehole conditions. $\alpha_{ED}$ can be measured by 3-component magnetometers downhole.

Figure 4:
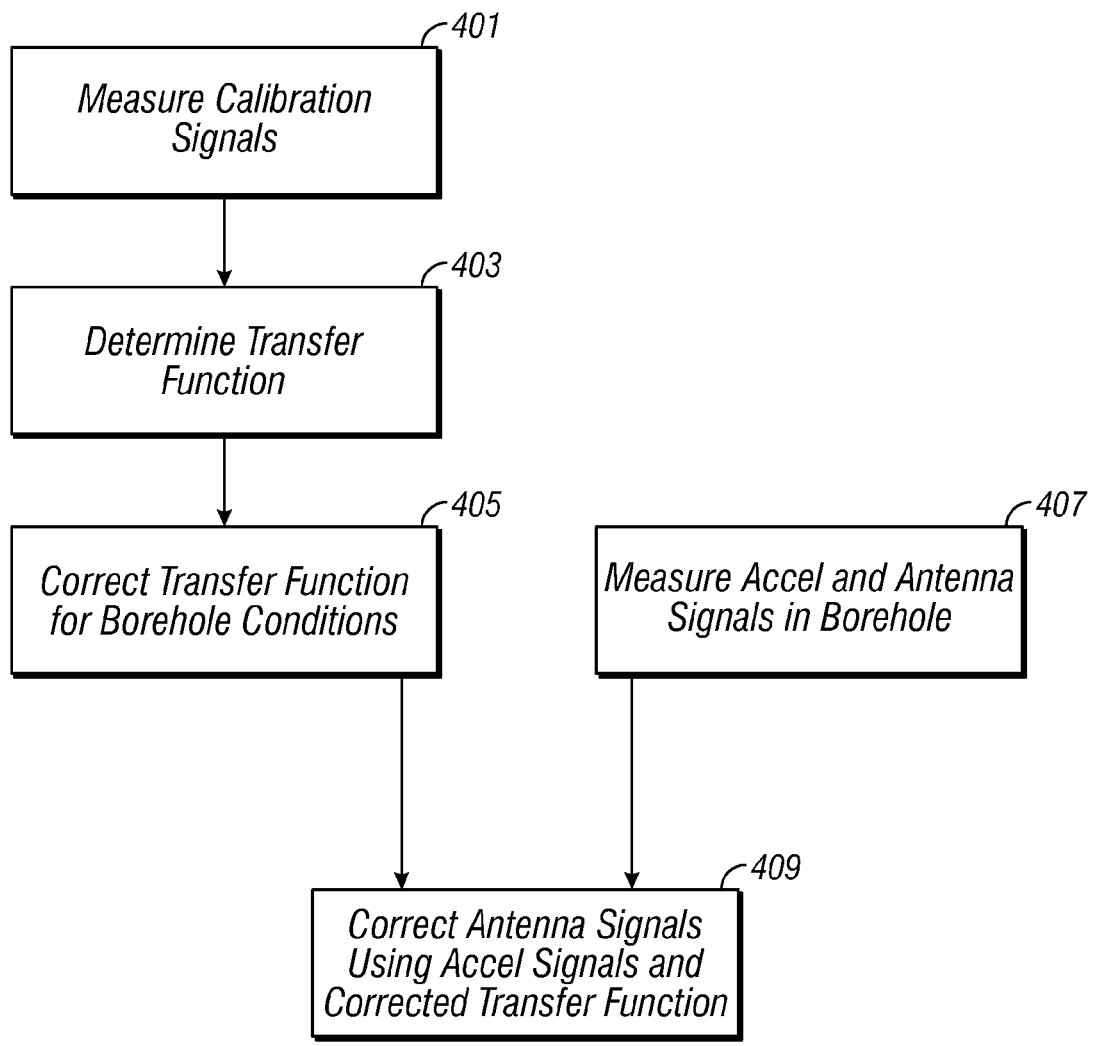
FIG. 4 is a flow chart illustrating some of the steps of the present disclosure.

This is illustrated in FIG. 4. Calibration signals are measured 401. These include the antenna measurements made during vibration of the tool and up to three accelerometer components. A transfer function is determined 403 as described above. Accelerometer and antenna signals are measured under downhole conditions 407. The antenna signal is corrected using eqn. (6) for up to 3 accelerometer signals using a corrected transfer function 405 discussed above.

As noted above, the tail end of the TEM signal has no formation signal. In one embodiment of the disclosure, instead of using a test tank for calibration, calibration measurements are made downhole using the tail end of the antenna signal. If this is done, then the step of correcting the transfer function for the inclination of the earth's magnetic field is not necessary if the correction for each measurement uses calibration signals measured at substantially the same depth as the measurement. It should be noted that the vibration of the drillstring at depth will be different from measurements in a test tank due at least to temperature differences and differences in weight on bit. Due to the thermal noise, it is desirable to estimate the transfer function using an average of a plurality of antenna measurements and accelerometer measurements.

Another embodiment disclosed in Dubinsky measures a reference accelerometer signal and a hydrophone signal in the borehole. A time-reversal is applied to the accelerometer signal and the hydrophone signal. The transfer function is derived estimating the power spectral densities of the two time-reversed signals, a cross-spectral density of the two time reversed signals, a transfer function between the two time reversed signals and a coherence between the two time reversed signals. One embodiment of the present disclosure uses a similar method wherein the first signal is the accelerometer signal and the second signal is the antenna signal.

Figure 5:
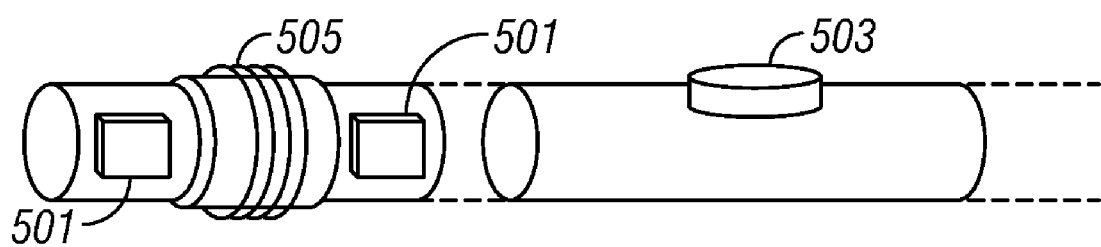
FIG. 5 shows an embodiment of the present disclosure for noise cancellation.

FIG. 5 shows an exemplary tool which includes a three-axis rotational accelerometer assembly 501, a three-axis directional magnetometer 503 along with a receiver antenna 505. The transmitter antenna is not shown as it is typically at a distance of 5 m or more.

The disclosure has been described above with reference to a MWD apparatus carried on a drillstring. The method of the disclosure can also be used on other types of MWD apparatus conveyed on a drilling tubular, and may also be used on a logging tool carried on a wireline. In particular it may be used in an ultra-deep transient wireline instrument where wobbling of a high sensitive receiver coil in the presence of the earth's magnetic field may cause unacceptable noise.

It should be further noted that while the example given about used axially oriented transmitters and receivers, this is not to be construed as a limitation. The method disclosed above may also be used with a transmitter and/or receiver oriented at an angle to the longitudinal axis of the logging tool. Specifically, using measurements made with axially oriented and transverse antennas as discussed in U.S. Pat. No. 7,167,006 to Itskovich, having the same assignee as the present disclosure and the contents of which are incorporated herein by reference, it is possible to get an accurate estimate of a distance to an interface and use it for reservoir navigation. The interface may be a gas-oil interface, an oil-water interface, a gas-water interface and/or a bed boundary. The estimated distance may be used for controlling a direction of drilling. The method disclosed in Itskovich '006 subtracts a reference signal measured in a substantially homogenous medium from the measured signal to remove the effect of a conductive body of the logging tool. U.S. Pat. No. 7,150,316 to Itskovich discloses use of a damping portion on the BHA for attenuate eddy currents on the tool body.

Implicit in the processing of the data is the use of a computer program on a suitable machine-readable medium that enables the processor to perform the control and processing. The machine-readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation, the method comprising:
   using a transmitter on a carrier conveyed in a borehole for producing an electromagnetic signal in the earth formation;
   using at least one antenna on the carrier for producing a first signal responsive to an interaction of the electromagnetic signal with the earth formation, the first signal including a noise resulting from a vibration of the carrier;
   correcting the first signal for the noise and producing a corrected first signal using a second signal indicative of the vibration of the carrier;
   estimating a distance to an interface in the earth formation using the corrected first signal; and
   conducting further operations using the estimated distance.

2. The method of claim 1 further comprising using at least one accelerometer on the carrier for providing the second signal wherein correcting the first signal further comprises using a transfer function relating a response of the at least one antenna and the at least one accelerometer to the vibration of the carrier.

3. The method of claim 2 further comprising estimating the transfer function using a measurement of the first signal and the at least one second signal in a test tank.

4. The method of claim 3 wherein estimating the transfer function further comprises making measurements of the first signal and the at least one second signal responsive to an excitation of the carrier by one of: (i) an impulsive force, and (ii) a plurality of substantially monochromatic acoustic signals.

5. The method of claim 3 wherein estimating the transfer function further comprises using a measurement of a latter portion of the first signal and a latter portion of the at least one second signal in a borehole.

6. The method of claim 3 wherein estimating the transfer function further comprises using at least one magnetometer to provide at least one third signal indicative of an orientation of the tool relative to a magnetic field of the earth during the vibration.

7. The method of claim 2 wherein using at least one accelerometer further comprises using a rotational accelerometer.

8. The method of claim 1 wherein the electromagnetic signal further comprises a transient electromagnetic signal.

9. An apparatus configured to evaluate an earth formation the apparatus comprising:
   a carrier configured to be conveyed in a borehole;
   a transmitter on the carrier configured to produce an electromagnetic signal in the earth formation;
   at least one antenna on the carrier configured to produce a first signal responsive to an interaction of the electromagnetic signal with the earth formation, the first signal including a noise resulting from a vibration of the carrier;
   at least one accelerometer on the carrier configured to produce at least one second signal indicative of the vibration of the carrier; and at least one processor configured to:
(a) produce a corrected first signal using the first signal and the at least one second signal;
(b) estimate a distance to an interface in the earth formation using the corrected first signal; and
(c) conduct further operations using the estimated distance.

10. The apparatus of claim 9 wherein the at least one processor is further configured to produce the corrected first signal by using a transfer function relating a response of the at least one antenna and the at least one accelerometer to the vibration of the carrier.

11. The apparatus of claim 10 wherein the at least one processor is further configured to estimate the transfer function using a measurement of the first signal and the at least one second signal in a test tank.

12. The apparatus of claim 10 wherein the at least one processor is configured to the transfer function using measurements of the first signal and the at least one second signal responsive to an excitation of the tool by one of: (i) an impulsive force, and (ii) a plurality of substantially monochromatic acoustic signals.

13. The apparatus of claim 10 wherein the at least one processor is configured to estimate the transfer function by further using a measurement of a latter portion of the first signal and a latter portion of the at least one second signal in a borehole.

14. The apparatus of claim 10 wherein the at least one processor is further configured to estimate the transfer function by further using a third signal from at least one magnetometer indicative of an orientation of the tool relative to a magnetic field of the earth during the vibration.

15. The apparatus of claim 10 the at least one accelerometer further comprises a rotational accelerometer.

16. The apparatus of claim 9 wherein the carrier comprises a bottomhole assembly, the apparatus further comprising a drilling tubular configured to convey the bottomhole assembly into the borehole.

17. A computer-readable medium product having stored thereon instructions that when read by at least one processor cause the at least one processor to execute a method, the method comprising:
correcting a first signal received by at least one antenna on a carrier conveyed in a borehole responsive to an electromagnetic signal produced by a transmitter on the carrier for an effect of a vibration of the carrier using a measurement made by an accelerometer on the carrier;
using the corrected first signal to estimate a distance to an interface in the earth formation; and
conducting further operations using the estimated distance.

18. The computer-readable medium of claim 17 further comprising at least one of: (i) a ROM, (ii) an EPROM, (iii) an EEPROM, (iv) a flash memory, and (v) an optical disk.

* * * * *